Nov. 29, 1955 W. D. HOUGHTON 2,725,419
APPARATUS FOR REPRODUCING IMAGES IN COLOR
Filed June 7, 1951
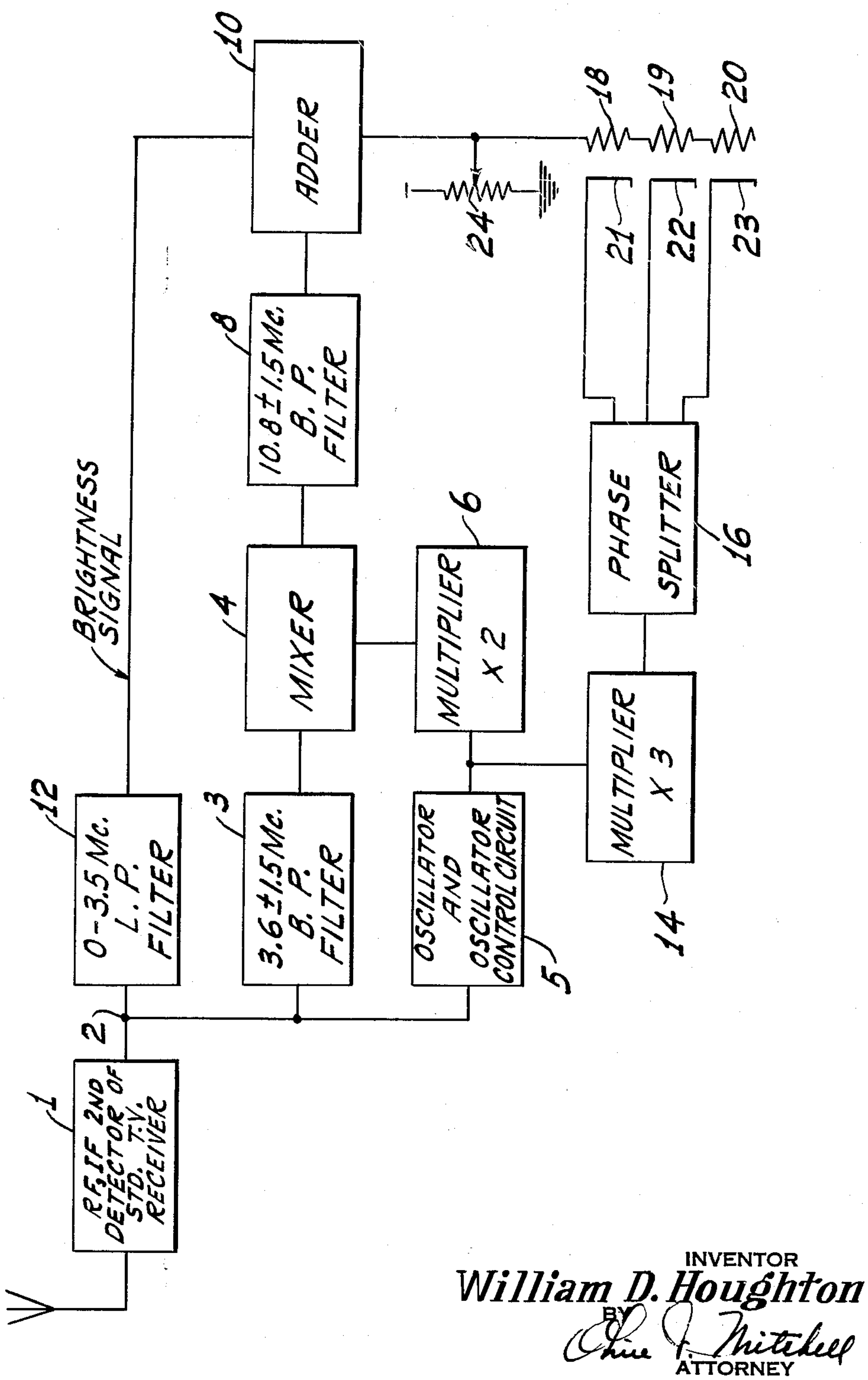
INVENTOR
William D. Houghton
BY Olive J. Mitchell
ATTORNEY 2,725,419

APPARATUS FOR REPRODUCING IMAGES IN COLOR

William D. Houghton, Princeton, N. J., assignor to Radio Corporation of America, a corporation of Delaware Application June 7, 1951, Serial No. 230,318

6 Claims. (Cl. 178—5.4)

This invention relates to apparatus for deriving individual color signals from a multiplexed color signal wherein the color signal consists of a phase and amplitude modulated subcarrier.

In color multiplexing systems of this type, the frequency with which a given color is repeated is termed the sampling frequency or subcarrier frequency. The sampling or subcarrier frequency is generally located in the upper end of the video spectrum. Mathematical analysis shows that the sampling frequency may be thought of as a subcarrier having sidebands that are representative of changes in color. The brightness information is combined with the color information and may occupy a range or band of frequencies including some of the color sideband frequencies. On the other hand, the band of frequencies occupied by the brightness signal on the band of the frequencies occupied by the sidebands of the sampling carrier may be mutually exclusive.

At a receiver the separate color signals may be recovered by sampling the band of color frequencies at appropriate time intervals.

If each component color is to be reproduced by a separate cathode ray tube such as in a trinescope, this sampling can be performed by placing the composite signal on the grids of each tube and sharp sampling or keying pulses of different phases on the different cathodes. The keying pulses occur in phase with the sampling intervals at the transmitter so that each cathode ray tube responds to signals representing a different color. This is known as high level sampling because it is done at the last point in the receiver where the color signals are amplified. Because the beams in the tubes are only turned on when a particular color is sampled, a dot pattern is produced on the screen. For this reason, the sampling process is generally performed at a point in the circuit preceding the cathode ray tube itself and the resulting pulses are smoothed out by an integrating filter before being applied to the cathode ray tube. However, if the gain or phase of the different color channels between the sampler and the cathode ray tubes differs, the color balance is upset and erroneous colors are reproduced.

It is therefore one object of the invention to provide apparatus whereby sharp sampling can be accomplished in a cathode ray tube without producing an objectionable dot pattern.

Colored images have also been produced in a single cathode ray tube having a plurality of guns. In one such tube each of the guns directs a beam of electrons through holes in a mask from different directions. A group of phosphor spots, each capable of producing fluorescent light of a different color when struck by a beam of electrons, is mounted on the far side of each hole so that each beam of electrons strikes a different spot. If the beams are keyed at sampling rate, some of the samples occur when the beams are centered on the holes so that a maximum number of electrons strike the different phosphor spots and a maximum amount of light is produced. At times the beams are keyed when they are scanning in between holes and no light is produced. Varying amounts of light are therefore produced depending on the relative phase between the keying pulses and the beam position with respect to the holes. This has been termed the moire effect.

It is therefore another object of this invention to provide apparatus for keying electron beams in a single color tube using an apertured mask in such manner as to reproduce images in color without objectionable moire.

Briefly these objectives may be obtained by placing the received band of color signals at a higher frequency and sampling at a proportionately higher frequency.

Other and incidental objects of the invention will become apparent upon a reading of the following description taken together with the drawing which illustrates by block diagram one form of this invention applied to a color television receiver.

This operation may be done by apparatus illustrated in the drawings. If the composite brightness and color signals are conveyed as a modulation on a main carrier, the sampling frequency bearing the color information may be thought of as a subcarrier. If this is the case, the composite brightness and color signals may be detected by any well known means. The composite brightness and color signals are applied to a terminal 2. A band pass filter 3 passes the band of frequencies containing the color information and applies them to a heterodyning mixer 4. Numeral 5 indicates apparatus for producing a wave having the same frequency and phase as the sampling subcarrier at the transmitter. This aparatus may comprise an oscillator arranged to have its phase controlled in accordance with a burst of subcarrier frequency on the back porch of the television signal as described in RCA Bulletins on Color Television and UHF published between 1949 and 1950. This subcarrier frequency may be multiplied in a multiplier 6 by any desirable amount before being applied to the mixer 4 so as to produce upper and lower side bands.

In this particular illustration, the upper side band is selected by a band pass filter 8 and applied to an adder 10. The brightness signal is selected from the composite signal appearing at the input terminal 2 by a low pass filter 12 and applied to the other input of the adder 10. The output of the adder 10 is similar to the composite signal appearing at the input terminal 2, differing mainly in the fact that the color information has been integrally multiplied so as to appear in a higher band of frequencies.

The color subcarrier frequency appearing at the output of the apparatus 5 is multiplied by a multiplier 14 by an integral number that is one more than the integral number by which it is multiplied in the multiplier 6. In this way the output of the multiplier 14 has the same frequency as the color carrier has in the upper sideband at the output of the mixer 4. If the multiplier 6 more than doubles the frequencies supplied by the apparatus 5, the multiplier 14 multiplies the output of the apparatus 5 by an integral number that is one less than the number by which these same frequencies are multiplied by the multiplier 6. The color carrier output of the multiplier 14 is split into phases corresponding to the phases employed at the transmitter by a phase splitter 16. Each of the differently phased outputs of the phase splitter 16 is used to key on the kinescope tube or tubes to provide a means of sampling the output of the adder 10 so as to produce signals uniquely representing the component colors. This can be done by applying the output of the adder 10 to each of three grids 18, 19, 20 and applying each of the differently phased outputs of the phase splitter 16 to one of the cathodes 21, 22, or 23. The grids 18, 19, and 20 are biased beyond cut off by a potentiometer 24 so that electrons flow from the cathodes 21, 22, and 23 only when the sine wave of voltage supplied by the various outputs of the phase splitter 16 is sufficiently negative to overcome the bias on the grid.

It is arranged that each of the beams of electrons emitted from the cathodes 21, 22, and 23 strike a phosphor that produces a different color. All of the grids and cathodes may be incorporated into a single color tube or they may be in separate tubes each adapted to reproduce a different color. In either arrangement when the color signal at the output of the adder 10 represents a given component color, the signals from the phase splitter 16 enable a beam of electrons to strike a phosphor that reproduces that color.

In an alternative arrangement, the band pass filter 8 can be made to pass the lower sideband of frequencies produced by the mixer 4. The multiplier 14 would multiply the output of apparatus 5 an integral number that is one less than the number by which the same output is multiplied in the multiplier 6.

What is claimed is:

1. In a color television system in which brightness signals occupy one range of video frequencies and color signals are conveyed as modulations of a carrier so as to occupy another range of video frequencies, receiving apparatus comprising in combination a first band pass filter adapted to pass the range of frequencies presents in said color signals, a source of oscillations of a frequency that is a multiple of the frequency of said carrier, a mixer coupled to receive the output of said first band pass filter and said source of oscillations in such manner that the oscillations are modulated by the color signals so to form upper and lower side bands, a second band pass filter coupled to the output of said mixes and adapted to pass one of said sidebands, a filter adapted to pass said brightness signals, an adder coupled to said latter filter and said second band pass filter, a second source of oscillations having a frequency equal to a multiple of the carrier frequency, a phase splitter having differently phased outputs to which said latter oscillations are applied, and means for keying the output of said adder with each of the differently phased outputs of said phase splitter.

2. In a color television system employing a band of brightness signals and a band of color signals occupied by a phase modulated color carrier, a receiver comprising in combination means for heterodyning the band of frequencies occupied by said color signals so that they occupy a higher frequency band than they previously occupied, means for combining said higher frequency band of color signals with the brightness signals, said combining means having an output circuit, a source of voltage waves equal in frequency to a multiple of the carrier frequency and having a predetermined phase relationship thereto, a phase splitter to which said voltage waves are applied, said phase splitter having a plurality of differently phased outputs, and means in which each of the differently phased outputs of said phase splitter are separately combined with the output of said combining means.

3. In a color television receiver adapted to reproduce images in color from a composite signal including a brightness signal and a subcarrier containing color signals, said subcarrier phase modulated with respect to hue and amplitude modulated in accordance with color saturation so as to occupy a given band of frequencies, each of said hues related to a prescribed phase of said subcarrier, apparatus for deriving separate color signals from the composite signal comprising in combination a source of the composite signal, filtering apparatus coupled to said source and adapted to yield one output signal having a selected band of frequencies occupied by said subcarrier, a source of voltage oscillations bearing an integral frequency relationship to the mean frequency of said subcarrier, a mixer coupled to the output of said filter and said source of voltage oscillations in such manner that the voltage oscillations are amplitude modulated with said output signal appearing at the output of the filter, a band pass filter coupled to the output of said mixer, said band pass filter being adapted to pass only one sideband produced by the amplitude modulator produced in the mixer, an adder having two inputs and an output, means for coupling one of said inputs to the source of the composite signal, means for coupling the other input of the adder to the output of said band pass filter, a source of voltage oscillator having a frequency that is the same as the frequency of the subcarrier after it has passed through said mixer, a phase splitter having an input and a plurality of outputs, means for coupling the input of said phase splitter to the output of the last mentioned source, a plurality of samplers each having two inputs and an output, means for coupling one input of each sampler to the output of said adder and means for coupling each of the other inputs to a different one of the outputs of said phase splitter.

4. In a color television receiver adapted to reproduce images in color from a composite signal including a brightness signal and a color carrier that is phase modulated with respect to hue and amplitude modulated in accordance with saturation so as to form sidebands, apparatus for deriving separate color signals from said composite signal comprising in combination, a source of the composite signal, first means for selecting the color carrier and at least some of its sidebands, second means coupled to said first means for translating the portions of the sidebands selected to a higher band of frequencies, means for combining the composite signal and the output of the second means, a voltage wave source, said voltage wave source yielding a voltage wave having a fixed phase relationship to and the same frequency as the color carrier has at the output of the second means, a phase splitter having an input and a plurality of inputs, means for coupling the input to said source, a plurality of samplers having two inputs, means for coupling one input of each sampler to the output of said combining means, and means for coupling each of the other inputs of the samplers to a different output of the phase splitter.

5. A color-television signal-translating system for translating a composite signal representative of an image in colors and including components representative of the brightness of said image and a subcarrier wave signal modulated by components representative of the color of said image, said subcarrier wave signal having a frequency in the vicinity of the highest frequency of said brightness components, whereby undesired spurious patterns tend to be visible in an image reproduced from said composite signal by an image-reproducing apparatus effecting time-sequential sampling of said composite signal at said subcarrier frequency, comprising: a first signal-translating channel responsive to said composite signal and having a pass band effective to translate said brightness components; a second signal-translating channel responsive to said composite signal and including signal-developing means having parameters so proportioned as to develop a subcarrier wave signal which is modulated by said color components and has a frequency substantially greater than said first-mentioned subcarrier frequency and than the highest frequency of said brightness components; means coupled to said channels for combining said translated brightness components and said developed modulated subcarrier wave signal to develop a resultant signal; means for developing at least one control signal of a frequency related to the frequency of said developed subcarrier wave signal; and an image-reproducing apparatus control system coupled to said control-signal developing means and energized by said control signal for effecting time-sequential sampling of said resultant signal at said developed subcarrier frequency, whereby an image-reproducing apparatus operating on said resultant signal and said control signal reproduces a color image in which any spurious patterns due to the sampling process are of low visibility.

6. A color-television system for reproducing a composite signal representative of an image in colors and including components representative of the brightness of said image and a subcarrier wave signal modulated by components representative of the color of said image said subcarrier wave signal having a frequency in the vicinity of the highest frequency of said brightness components, whereby undesired spurious patterns tend to be visible in an image reproduced from said composite signal by a tricolor cathode-ray image-reproducing tube effecting time-sequential sampling of said composite signal at said subcarrier frequency, comprising: a tricolor cathode-ray image-reproducing tube having a control electrode-cathode input circuit; a first signal translating channel responsive to said composite signal and having a pass band effective to translate said brightness components; a second signal-translating channel responsive to said composite signal and including signal-developing means having parameters so proportioned as to develop a subcarrier wave signal which is modulated by said color components and has a frequency substantially greater than said first-mentioned subcarrier frequency and than the highest frequency of said brightness components; means coupled to said input circuit and said channels for combining said translated brightness components and said developed modulated subcarrier wave signal to develop a resultant signal; means for developing at least one control signal of a frequency related to the frequency of said developed subcarrier wave signal; and an image-reproducing tube control system coupled to said input circuit and said control-signal developing means and energized by said control signal for effecting time-sequential sampling of said resultant signal at said developed subcarrier frequency, whereby said tube reproduces a color image in which any spurious patterns due to the sampling process are of low visibility.

References Cited in the file of this patent

UNITED STATES PATENTS

| | | |
|---|---|---|
| 2,627,549 | Kell | Feb. 3, 1953 |
| 2,632,046 | Goldberg | Mar. 17, 1953 |

OTHER REFERENCES

"RCA's New Direct-View Tri-Color Kinescopes," Radio and Television News, June 1950, pages 46, 47 and 118.

"Comparative Analysis of Color TV Systems," Electronics, February 1951, pages 92–96.